(12) United States Patent
Graves et al.

(10) Patent No.: US 10,652,255 B2
(45) Date of Patent: May 12, 2020

(54) FORENSIC ANALYSIS

(71) Applicant: Fortinet, Inc., Sunnyvale, CA (US)

(72) Inventors: Jamie Robert Graves, Edinburgh (GB); Matthew John Little, Edinburgh (GB); Oleksii Mandrychenko, Edinburgh (GB); Carson Leonard, Edinburgh (GB)

(73) Assignee: Fortinet, Inc., Sunnyvale, CA (US)

( * ) Notice: Subject to any disclaimer, the term of this patent is extended or adjusted under 35 U.S.C. 154(b) by 99 days.

(21) Appl. No.: 15/558,340

(22) PCT Filed: Mar. 10, 2016

(86) PCT No.: PCT/GB2016/050659
§ 371 (c)(1),
(2) Date: Sep. 14, 2017

(87) PCT Pub. No.: WO2016/146973
PCT Pub. Date: Sep. 22, 2016

(65) Prior Publication Data
US 2018/0069881 A1  Mar. 8, 2018

(30) Foreign Application Priority Data
Mar. 18, 2015 (GB) .................................. 1504612.1

(51) Int. Cl.
*H04L 29/06* (2006.01)
*G06F 16/35* (2019.01)
(Continued)

(52) U.S. Cl.
CPC .......... *H04L 63/1425* (2013.01); *G06F 16/35* (2019.01); *H03M 7/30* (2013.01); *H04L 43/028* (2013.01); *H04L 63/1408* (2013.01)

(58) Field of Classification Search
CPC ............. H04L 63/1425; H04L 63/1408; H04L 43/028; G06F 16/35
See application file for complete search history.

(56) References Cited

U.S. PATENT DOCUMENTS

| 6,742,124 B1 | 5/2004 | Kilpatrick et al. |
| 8,887,274 B2 | 11/2014 | Buchanan et al. |

(Continued)

FOREIGN PATENT DOCUMENTS

| CN | 1777119 | 5/2006 |
| CN | 101425936 | 5/2009 |

(Continued)

OTHER PUBLICATIONS

International Search Report of Counterpart PCT International Application No. PCT/GB2016/050659.
(Continued)

*Primary Examiner* — David Le
(74) *Attorney, Agent, or Firm* — Jaffery Watson Mendonsa & Hamilton, LLP

(57) ABSTRACT

The present invention relates to a forensic analysis method performed on a Distributed Computing System (DCS) (10) comprising a server (18) and at least one client machine (14). The method comprises collecting data in a client machine (14) of the DCS (10) to form a first data set, the collected data being a function call to a resource comprised in the DCS. The method further comprises applying a data reduction model to the first data set to form a second data set and processing the second data set in the server (18) of the DCS (10) to provide for detection of suspect behaviour at the client machine (14). The data reduction model is configured to extract a subset of data from the first data set to form the second data set, the subset of data comprising: user account identifier; and process and object identifier.

18 Claims, 7 Drawing Sheets

(51) Int. Cl.
*H04L 12/26* (2006.01)
*H03M 7/30* (2006.01)

(56) References Cited

U.S. PATENT DOCUMENTS

| | | | |
|---|---|---|---|
| 2002/0045437 A1* | 4/2002 | Kesler | H04M 1/67 455/411 |
| 2002/0046275 A1 | 4/2002 | Crosbie et al. | |
| 2002/0065695 A1 | 5/2002 | Francoeur et al. | |
| 2003/0014383 A1 | 1/2003 | Cho et al. | |
| 2004/0025044 A1* | 2/2004 | Day | H04L 63/1408 726/23 |
| 2004/0230530 A1 | 11/2004 | Searl et al. | |
| 2005/0076390 A1 | 4/2005 | Klausberger et al. | |
| 2005/0097366 A1 | 5/2005 | McCreight et al. | |
| 2005/0262136 A1 | 11/2005 | Lloyd et al. | |
| 2006/0053498 A1 | 3/2006 | Bejanin et al. | |
| 2006/0064416 A1 | 3/2006 | Sim-Tang | |
| 2006/0069540 A1 | 3/2006 | Krutz | |
| 2006/0101413 A1 | 5/2006 | Kinno et al. | |
| 2007/0107052 A1 | 5/2007 | Cangini et al. | |
| 2007/0139231 A1 | 6/2007 | Walia et al. | |
| 2007/0157210 A1 | 7/2007 | Inoue | |
| 2007/0226170 A1 | 9/2007 | Sun | |
| 2007/0261120 A1 | 11/2007 | Arbaugh et al. | |
| 2007/0300290 A1* | 12/2007 | Shay | H04L 63/0428 726/3 |
| 2007/0300301 A1 | 12/2007 | Cangini et al. | |
| 2008/0065811 A1 | 3/2008 | Jahangiri | |
| 2008/0120720 A1 | 5/2008 | Guo et al. | |
| 2008/0186872 A1 | 8/2008 | Zaencker | |
| 2008/0222717 A1 | 9/2008 | Rothstein et al. | |
| 2009/0106012 A1 | 4/2009 | Liu | |
| 2009/0210368 A1 | 8/2009 | Deo et al. | |
| 2010/0046378 A1* | 2/2010 | Knapp | H04L 41/0604 370/242 |
| 2010/0223244 A1 | 9/2010 | Sinha et al. | |
| 2010/0284288 A1 | 11/2010 | Lee et al. | |
| 2011/0035804 A1 | 2/2011 | Moghe | |
| 2011/0040812 A1* | 2/2011 | Phillips | G06F 9/45541 707/822 |
| 2011/0153748 A1 | 6/2011 | Lee et al. | |
| 2012/0011153 A1* | 1/2012 | Buchanan | G06F 21/552 707/771 |
| 2013/0030773 A1* | 1/2013 | O'Hare | G06F 17/50 703/1 |
| 2013/0091539 A1* | 4/2013 | Khurana | G06F 21/552 726/1 |
| 2014/0157407 A1 | 6/2014 | Krishnan et al. | |
| 2014/0165137 A1 | 6/2014 | Balinsky et al. | |
| 2014/0188840 A1 | 7/2014 | Agarwal et al. | |
| 2015/0264077 A1 | 9/2015 | Berger et al. | |
| 2018/0069881 A1 | 3/2018 | Graves et al. | |
| 2018/0351979 A1 | 12/2018 | Mandrychenko et al. | |

FOREIGN PATENT DOCUMENTS

| | | |
|---|---|---|
| CN | 202172419 | 3/2012 |
| CN | 102420723 | 4/2012 |
| CN | 102539980 | 7/2012 |
| CN | 102664772 | 9/2012 |
| CN | 103617104 | 3/2014 |
| CN | 103744752 | 4/2014 |
| EP | 0 985 995 A1 | 3/2000 |
| IE | 920074 | 7/1992 |
| KR | 20080063952 | 7/2008 |
| WO | 2004/012063 | 2/2004 |
| WO | 2013/128428 | 9/2013 |

OTHER PUBLICATIONS

Hofmeyr, Steven A., et al., "Intrusion Detection using Sequences of System Calls", Journal of Computer Security, vol. 6, No. 3, Aug. 18, 1998, 25 pages.

Coull, S., et al., "Intrusion detection: a bioinformatics approach", Proceedings of the 19th Annual Computer Security Applications Conference, IEEE, Dec. 8, 2003, pp. 24-33.

Coull, et al., "Sequence Alignment for masquerade detection", Computational Statistics and Data Analysis, North-Holland, Amsterdam, NL, vol. 52, No. 8, Feb. 5, 2008, pp. 4116-4131.

Wespi, A., et al., "An intrusion-detection system based on the teiresias pattern discovery algorithm", EICAR 1999, 15 pages.

Florez-Larrahondo, German, et al., Intrusion Detection Using Text Processing Techniques with a Binary-Weighted Cosine Metric, Journal of Information Assurance and Security, 2006, pp. 59-77.

Bing, Yue, et al., "An Anomaly Intrusion Detection Method Using Fourier Transform", Journal of Electronics (China), vol. 21, No. 2, Mar. 2004, pp. 135-139.

Karlin, S., et al., "Methods for assessing the statistical significance of molecular sequence features by using general scoring schemes", Proceedings of the National Academy of Sciences of USA, National Academy of Science, Washington, DC, US, vol. 87, Mar. 1, 1990, pp. 2264-2268.

Forrest, Stephanie, et al., "A Sense of Self for Unix Processes", 1996 IEEE Symposium on Security and Privacy, IEEE Computer Society Press, Los Alamitos, CA, pp. 120-128 (1996).

Forrest, S., et al., "Self-Nonself Discrimination in a Computer", Proceedings of 1994 IEEE Symposium on Research in Security and Privacy (in press), 11 pages.

Schafer, Andreas, "International Search Report", for PCT/GB2009/051142, dated Dec. 8, 2009, 4 pages.

* cited by examiner

```
Date & Time:   20/01/2015 10:23:42        110
Event Class:   File System
Operation:     FASTIO_QUERY_INFORMATION    106
Result:    SUCCESS
Path:      C:\Users\Jamie\Desktop\test.txt    108
PID:       50064
TID:       50160
Duration:      0.0000163
Type:      QueryBasicInformationFile
CreationTime:   19/01/2015  16:50:54
LastAccessTime:    19/01/2015  16:50:55
LastWriteTime: 20/01/2015  09:35:31
ChangeTime:    20/01/2015  09:35:31
FileAttributes:   A
```

FORENSIC ANALYSIS

FIELD OF THE INVENTION

The present invention relates to a forensic analysis method performed in a Digital Computing System (DCS) which in particular but not exclusively comprises a server and at least one client machine. The present invention also relates to a computer program and to a computer system each comprising instructions for causing a computer to perform a forensic analysis method. The present invention further relates to a Distributed Computing System (DCS) configured to perform forensic analysis.

BACKGROUND ART

Locard's exchange principle holds that the perpetrator of a crime will bring something to a crime scene and will leave with something from the crime scene and that each act can yield forensic evidence. Forensic investigation therefore involves collecting, preserving and analysing evidence of a crime. Although Digital Computing Systems (DCSs) process and store virtual material, or rather data in electronic form, and not physical material, Locard's exchange principle still holds. Forensic investigation may be carried out on a DCS to detect suspect or anomalous behaviour in the DCS with such suspect or anomalous behaviour being, for example, caused by malware, a disgruntled employee or human error. Such forensic investigation may relate to an act of a criminal nature or may relate to a less extreme act which nevertheless infringes against regulations, such as an IT usage policy, imposed by an organisation Forensic investigation in the context of a DCS, or alternatively digital forensics, is thus of wider applicability than conventional forensic investigation involving physical material.

The terms digital forensics, forensic investigation and forensic analysis as used herein are to be understood to refer to investigative or analytical activity relating to any DCS where a DCS is any apparatus that manipulates, stores or otherwise processes digital information. By way of example, computers and networks of computers of all types, mobile telephones, personal digital assistants, media players, set-top boxes, games consoles, televisions and associated network components, such as routers, switches, hubs, servers and broadcast equipment, are covered by the term DCS.

Every DCS creates, stores or manipulates digital information with such digital information forming the basis of digital evidence. A DCS typically creates a diverse range of data further to the data familiar to the everyday user of the DCS. For example, for every text document created and saved to a hard disk or for every data packet routed from one part of a network to another, a voluminous amount of data relating to such an activity is created. Such data may be useful and can be used in one or more of a variety of ways from debugging to operation monitoring. Often all data created by a DCS is regarded as of possible relevance to a digital forensics investigation.

It is known in DCSs comprising a server and plural client machines to collect data of forensic value at each client machine and to transmit the collected data to the server where forensic analysis is carried out. Analysis may, for example, involve matching strings of collected data with a library of reference data strings which represent normal behaviour. If a subject collected data string fails to match any of the reference data strings, then the conclusion is drawn that there has been suspect or anomalous computer behaviour such is caused by the like of malware, a disgruntled employee or human error. Normally the forensic analysis is carried out on the server as a non-real time operation.

The inventors have become appreciative of the value of performing real time or near real time forensic analysis on the server of data collected from client machines. Prompt detection of suspect or anomalous computer behaviour provides for correspondingly prompt action to thereby increase the likelihood of containing the threat, be it a person or malware, before further or undue damage is done. The inventors have recognised that limited resources of a DCS may present an obstacle to real time or near real time forensic analysis on the server. For example the communication channel between a client machine and the server may militate against real time or near real time forensic analysis on the server by presenting a bottleneck to prompt transfer of collected data from the client machine to the server. By way of further example and in certain circumstances, limited processing capability of the server, such as a file server of modest processing power, may hinder real time or near real time processing of collected data in the server.

The present invention has been devised in the light of the inventors' recognition. It is therefore an object for the present invention to provide an improved forensic analysis method performed in a Digital Computing System (DCS) comprising a server and at least one client machine in which the server processes data in dependence on data collected at a client machine to provide for detection of suspect or anomalous behaviour at the client machine.

It is a further object for the present invention to provide a computer program and a computer system each comprising instructions for causing a computer comprising a server and at least one client machine to perform a forensic analysis method in which the server processes data in dependence on data collected at a client machine to provide for detection of suspect or anomalous behaviour at the client machine.

It is a yet further object for the present invention to provide a Distributed Computing System (DCS) comprising a server and at least one client machine which is configured to perform forensic analysis in which the server processes data in dependence on data collected at a client machine to provide for detection of suspect or anomalous behaviour at the client machine.

STATEMENT OF INVENTION

According to a first aspect of the present invention there is provided a forensic analysis method performed on a Distributed Computing System (DCS) comprising a server and at least one client machine, the method comprising:
  collecting data in a client machine of the DCS to form a first data set, the collected data being a function call to a resource comprised in the DCS;
  applying a data reduction model to the first data set to form a second data set; and
  processing the second data set in the server of the DCS to provide for detection of suspect behaviour at the client machine, in which
  the data reduction model is configured to extract a subset of data from the first data set to form the second data set, the subset of data comprising: user account identifier; and process and object identifier.

The forensic analysis method is performed in a DCS comprising a server and at least one client machine. Typically the DCS may comprise plural client machines with in many circumstances the plural client machines being located remote from the server and from each other. The forensic analysis method comprises collecting data in a client machine to form a first data set, the collected data being a function call to a resource comprised in the DCS. The function call may, for example, be a system call (or alternatively syscall). The first data set may comprise and may furthermore consist of the collected data. As mentioned above a voluminous amount of data relating to an activity such as a function call may be created. The voluminous amount of data may impose a burden that is prejudicial to real time or near real time processing of the collected data. The forensic analysis method therefore further comprises applying a data reduction model to the first data set to form a second data set. The second data set is processed in the server to provide for detection of suspect behaviour at the client machine. Suspect behaviour at the client machine may, for example, be caused by malware, a disgruntled employee or human error.

The data reduction model applied in the forensic analysis method is configured to extract a subset of data from the first data set to form the second data set, the subset of data comprising: user account identifier; and process and object identifier. The first data set typically consists of a large number of data elements. For example a system call consists of 140 to 160 data elements. The inventors have recognised that specific elements of the first data set, which represent a subset and more specifically a small part of the first data set, such as no more than 10 data elements, may suffice for forensic analysis. Processing to provide for detection of suspect behaviour may be performed in the server on the second data set in real time or near real time on account of the second data set being smaller than the first data set. The obstacle presented by the limited resources of the DCS to analysis of data for detection of anomalous behaviour may be thus addressed by way of application of the data reduction model.

The data reduction model may be embodied in a data reduction algorithm. The data reduction algorithm may comprise a minifilter developed to the Microsoft Filter Manager model. The method may further comprise storing the second data set in data storage, such as a ring buffer, which may be comprised in the server. Alternatively or in addition the method may further comprise forming a data transfer object in dependence on the second data set. More specifically the data transfer object may be formed before being stored in data storage.

A number of data elements of the second data set may be no more than half a number of data elements of the first data set. More specifically the number of data elements of the second data set may be no more than 40%, 30%, 20% or 10% of the number of data elements of the first data set. The second data set may consist of no more than ten data elements.

The second data set is processed in the server to provide for detection of suspect behaviour at the client machine. Data collected in the client machine therefore may be conveyed by some means from the client machine to the server. Data may be conveyed from the client machine to the server by way of a communication channel. The communication channel may comprise at least one of: a wired link, such as an electrical conduit; optical fibre; and a wireless link. The communication channel may thus be of conventional form and function.

In a first embodiment, the data reduction model may be applied to the first data set in the client machine to form the second data set. The second data set may be then conveyed from the client machine to the server by way of the communication channel. A bottleneck presented by a communication channel between a client machine and the server may be addressed by transmitting the second data set instead of the larger first data set.

In a second embodiment, the data reduction model may be applied to the first data set in the server to form the second data set. The first data set may be therefore conveyed from the client machine to the server by way of the communication channel before the data reduction model is applied. In certain configurations of DCS the client machines may be of thick client form and the server may be of limited resource. The communications channel may present an insufficient bottleneck to conveying data to hinder real time or near real time processing in the server. On the other hand, application of the data reduction model in the server may reduce demand on the limited resource of the server and thereby provide for real time or near real time processing in the server.

The data reduction model provides for extraction from the first data set of certain specific elements which have been found to be important for performing useful forensic analysis. The certain specific elements comprise: user account identifier; and process and object identifier. The user account identifier element provides for identification of who is responsible for the suspect behaviour, be it a person or a computer process such as malware. The user account identifier may identify: a person who is recorded by the client machine as a user of the client machine; or a program, such as a malware program, which is operative on the client machine.

The process and object identifier element provides for identification of what is being operated on as part of the suspect behaviour. For example the process and object identifier element may be for invoking a read or write operation on a specific entity such as a file. Typically the process and the object are present together because a process is usually accompanied by an object. The object identifier may be one of: a physical resource identifier, such as for a removable drive, a mobile device or a fileserver; and a logical object identifier, such as for a file or the like of a table in a database. The 'who' and the 'what' elements have been recognised by the inventors as important in detecting suspect behaviour.

The subset of data extracted by the data reduction model may further comprise a time element. The time element may have the form of a time stamp comprising the time and perhaps also the date when the process of the process and object identifier was invoked. The inventors have identified 'time' as being important in certain circumstances for detecting anomalous behaviour. The time element, i.e. the 'when' element, may have the form of a Universal Coordinated Time (UTC) time-stamp for the DCS.

The subset of data extracted by the data reduction model may further comprise: a location identifier. A location identifier i.e. the 'where' element, specifies the location of one of: the software agent acting for the user account that initiates the function call; and the object operated on by the process. The location identifier may be in respect of one of a physical location in the DCS and a logical location in the DCS.

In many circumstances the four 'who', 'what', 'when' and 'where' elements may be important in determining the 'why' of a forensic investigation, the 'why' relating to the nature of the suspect behaviour that may be determined in dependence on the four elements.

As mentioned above, the function call may be a system call (or alternatively syscall). The data collected at the client machine may therefore be system call (or syscall) data. A system call may be any request made between the user space and the kernel space. Basing a forensic investigation on data present at the lower levels of the DCS, such as system call data, has advantages of the data being less liable to manipulation and the data lending itself more readily to validation to determine its authenticity. However, data present at the lower levels of the DCS tends to be more voluminous than corresponding data at higher levels of the DCS thereby increasing demands on the DCS were it not for application of the data reduction model according to the present invention.

The step of collecting data in the client machine may comprise acquiring function call data from the client machine. Acquiring function call data may comprise application of a collection tool which is operative to acquire the function call data. The step of collecting data in the client machine may comprise storing collected function call data in data storage. The data storage may be comprised in the DCS. The step of collecting data in the client machine may comprise filtering the collected function call data. Filtering may be carried out before the step of applying the data reduction model. Filtering may comprise extracting file related function call data. More specifically filtering may not extract registry, process and memory related function call data. Filtering may thus reduce the amount of data before the data reduction model is applied. Where the data reduction model is embodied in a minifilter developed to the Microsoft Filter Manager model, filtering may, for example, be accomplished by configuring an algorithm to filter function call data before the filtered data is operated on by the minifilter. The algorithm may be comprised in the minifilter or may be apart from the minifilter.

As discussed above, the method comprises collecting data in a client machine to form a first data set, the collected data being a function call to a resource comprised in the DCS. According to an approach, the first data set may be formed from data collected per se in the client machine. According to another approach, the first data set may be formed from a copy of data collected in the client machine. More specifically the method may comprise copying function call data from the client machine and forming the first data set from the copied function call data. The function call data may be copied by one or more of various known processes depending on circumstances. Such various known processes may comprise what is termed interprocess communications (IPC) methods, such as data copy or RPC.

As mentioned above, the method comprises processing the second data set in the server to provide for detection of suspect behaviour at the client machine. The method may further comprise reading the second data set from data storage, such as a ring buffer, before processing the second data set in the server to provide for detection of suspect behaviour at the client machine. As mentioned elsewhere herein the second data set may be stored in the second data set as a data transfer object. The step of processing the second data set in the server may comprise analysing the second data set to detect suspect behaviour. Analysing the second data set to detect suspect behaviour may comprise comparing the second data set with plural reference data sets and detecting suspect behaviour in dependence on the comparison. The plural reference data sets may represent one of normal behaviour and suspect behaviour. Where the plural reference data sets represent normal behaviour, failure to match the second data set with any one of the plural reference data sets may be indicative of suspect behaviour having been performed on the client machine. Where the plural reference data sets represent suspect behaviour, matching the second data set with at least one of the plural reference data sets may be indicative of suspect behaviour having been performed on the client machine.

Forensic analysis often involves addressing complex patterns of collected data. Processing the second data set in the server of the DCS to provide for detection of suspect behaviour at the client machine may therefore comprise applying the second data set to an expert system. Application of the second data set to the expert system may be operative to process the second data set to provide for detection of suspect behaviour at the client machine. Use of an expert system may in many circumstances be advantageous compared with more straightforward comparison of the second data set with plural reference data sets.

The expert system may comprise a model of behaviour. The model of behaviour may be formed in dependence on reference data. The model of behaviour may be formed in an unsupervised manner. The model of behaviour may comprise a model of normal behaviour, i.e. behaviour which is not of a suspect nature, in dependence on normal reference data which reflects normal behaviour of the DCS. The model of behaviour may be formed in dependence on reference data collected in a client machine of the DCS and more specifically function call data. The expert system may comprise a clustering algorithm which is operative to perform clustering of the reference data.

An outlier detection algorithm may be configured to apply the second data set to the model of behaviour and to determine whether or not the second data set is in accordance with the model. Where the model of behaviour comprises plural submodels, the outlier detection algorithm may be operative to apply the second data set to an appropriate submodel in dependence on an identifier comprised in the second data set, such as a process of a process and object identifier or a user account identifier. Where the model is formed in dependence on normal reference data, the second data set not being in accordance with the model may be indicative of the second data set reflecting suspect behaviour. For example, where the expert system comprises a clustering algorithm the outlier detection algorithm may be operative to determine whether or not the second data set falls within the scope of at least one cluster formed by the clustering algorithm. Where the second data set is not in accordance with the model, the outlier detection algorithm may be configured to provide an alert. The forensic analysis method may comprise providing an output in dependence on the alert. The output may comprise a human perceptible indication, as described elsewhere herein, that suspect behaviour has been performed on the client machine.

The forensic analysis method may further comprise modifying the model in dependence on user interaction with the DCS. The model may thus be modified in a supervised manner. More specifically the model may be modified in dependence on the alert and more specifically in dependence on the human perceptible indication. It may be advantageous to have a user assess whether or not the second data set actually represents suspect behaviour and provide for modification of the model in dependence on the user's assessment. The forensic analysis method may therefore provide for modification of the model by way of an input-output arrangement comprised in the DCS. More specifically the forensic analysis method may comprise prompting the user by way of the input-output arrangement to modify the model. For example a message may be provided to the user, such as on a visual display unit, and the user may be afforded an opportunity to re-classify the alert as relating to normal behaviour by way of a user operable part of the input-output arrangement such as a clickable area on the visual display unit.

The model formed by the outlier detection algorithm may comprise plural submodels. Each submodel may be separately formed from a different form of reference data. More specifically each submodel may be formed from reference data relating to one of: a different function call; and a different user, be it a person or a computer process such as malware. A function call may be identified by way of a name of a process, such as is comprised in a process and object identifier. A user may be identified by way of a user account identifier. By way of example, the model may comprise sixty different submodels relating to different function calls. By way of further example, the model may comprise thirty different submodels relating to different users.

The forensic analysis method may comprise performing analysis in dependence on the second data set and more specifically upon application of the second data set to the expert system. The analysis may provide for at least one determination to be made in respect of the nature of the suspect behaviour. Analysis may determine that a second data set of the same form as reference data, for example the same functional call or same user, exhibits different behaviour to the reference data. Analysis may determine that a second data set of different form to reference data, for example different functional calls or different users, exhibit the same or similar behaviour. This may reflect a process masquerading as another process or a user masquerading as another user. Analysis may determine that a second data set fails to match or is insufficiently close to reference data of any form in the model. This may reflect the presence of malware where the second data set relates to a function call or may reflect the presence of an unauthorised user or an authorised user behaving in an inappropriate fashion where the second data set relates to a user.

The method may comprise providing an output in dependence on the step of analysing the second data set to detect suspect behaviour. The output may comprise a human perceptible indication that suspect behaviour has been performed on the client machine. Providing an output may comprise at least one of: operation of an output device, such as providing a message on a video display unit comprised in the DCS or on hardcopy produced by the like of a printer comprised in the DCS; and storing data in data storage, such as in a log file.

The client machine may be one of: a PC; removable data storage; and a mobile device. The forensic analysis method may be performed in the DCS. More specifically the forensic analysis method may be performed entirely in the DCS.

The forensic analysis method may be a real time or near real time forensic analysis method. Herein real time or near real time may mean a method or process that is operative in less than five minutes.

According to a second aspect of the present invention there is provided a computer program comprising instructions for causing a computer to perform the method according to the first aspect of the present invention. The computer performing the method according to the first aspect of the present invention may be the DCS.

The computer program may be at least one of: embodied on a record medium; embodied in read only memory; stored in computer memory; and carried on an electrical carrier signal. The computer program may be stored in a non-transitory medium for storing data for access by an application program being executed on a computer and more specifically on the DCS.

Further embodiments of the second aspect of the present invention may comprise one or more further features of the first aspect of the present invention.

According to a third aspect of the present invention there is provided a computer system comprising program instructions for causing a computer and more specifically the DCS to perform the method according to the first aspect of the present invention.

The program instructions may be at least one of: embodied on a record medium; embodied in read only memory; stored in computer memory; and carried on an electrical carrier signal. The program instructions may be stored in a non-transitory medium for storing data for access by an application program being executed on a computer and more specifically on the DCS.

Further embodiments of the third aspect of the present invention may comprise one or more further features of the first aspect of the present invention.

According to a fourth aspect of the present invention there is provided a Distributed Computing System (DCS) comprising a server and at least one client machine, the DCS being configured to perform forensic analysis by collecting data in a client machine to form a first data set, the collected data being a function call to a resource comprised in the DCS, to apply a data reduction model to the first data set to form a second data set and to process the second data set in the server of the DCS to provide for detection of suspect behaviour at the client machine, in which the data reduction model is configured to extract a subset of data from the first data set to form the second data set, the subset of data comprising: user account identifier; and process and object identifier.

Embodiments of the fourth aspect of the present invention may comprise one or more features of the first aspect of the present invention.

According to a further aspect of the present invention there is provided an analysis method performed on a Digital Computing System (DCS), the method comprising: collecting data from the DCS to form a first data set; applying a data reduction model to the first data set to form a second data set; and processing the second data set to provide for detection of suspect behaviour in the DCS, in which the data reduction model is configured to extract a subset of data from the first data set to form the second data set.

The analysis method may be a forensic analysis method. The DCS may comprise a server and at least one client machine. The data forming the first data set may be collected in a client machine of the DCS. The second data set may be processed in the server of the DCS to provide for detection of suspect behaviour at the client machine.

The collected data may be a function call to a resource comprised in the DCS. The subset of data may comprise: user account identifier; and process and object identifier. Further embodiments of the further aspect of the present invention may comprise one or more features of any other aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
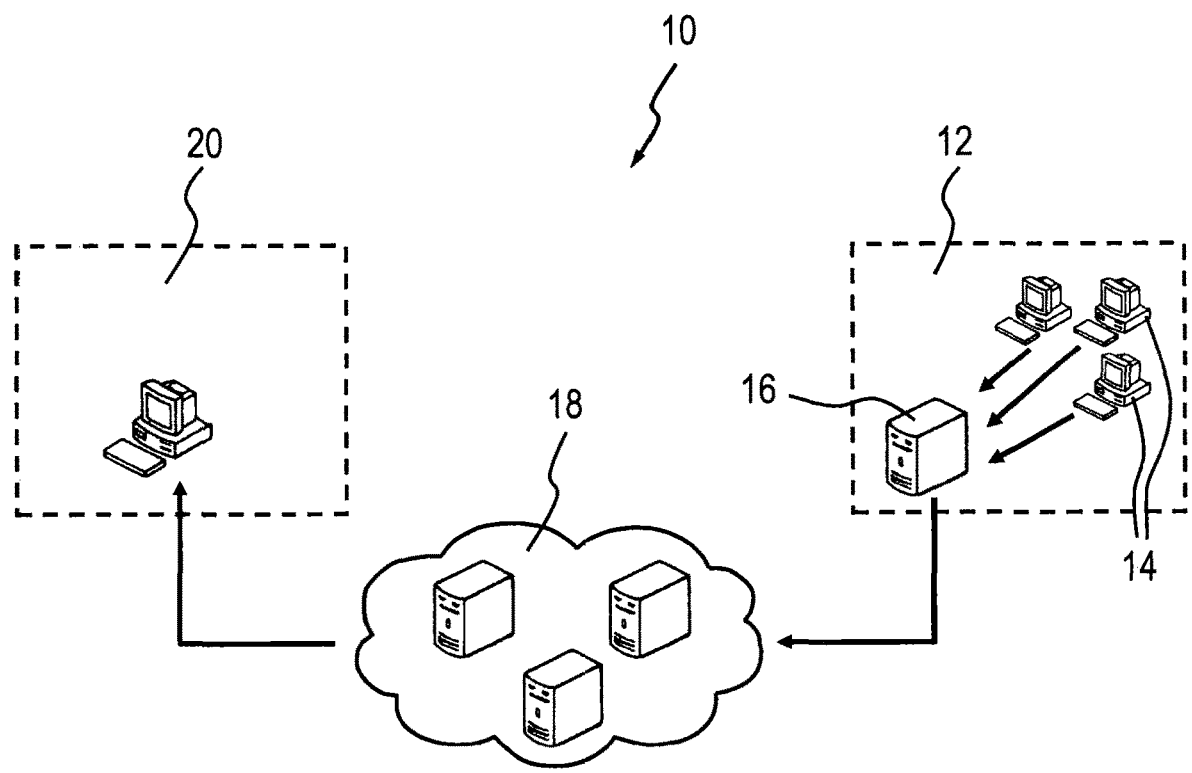
FIG. 1 is representation of a Digital Computing System (DCS) according to an embodiment of the present invention.

A representation of a Digital Computing System (DCS) 10 according to an embodiment of the present invention is shown in FIG. 1. More specifically FIG. 1 shows a clustered service oriented architecture (SOA). The DCS 10 of FIG. 1 comprises a host organisation 12 which in turn comprises plural client machines 14, which are each subject to analysis according to the present invention, and a buffer computer 16. Data collected for analysis from each client machine 14 is conveyed over a network (which constitutes a communication channel) to the buffer computer 16. The buffer computer 16 is operative to receive and coordinate data received from the client machines 14 and to convey the data over a network (which constitutes a communication channel) to a cluster 18 (which constitutes a server) comprised in the DCS 10. The cluster 18, which comprises at least one server and often plural servers, is physically and logically independent of the host organisation 12 and is therefore hosted within or outside the host organisation 12. According to a first approach, analysis according to the present invention is performed in the cluster 18. According to a second approach, an external party computer 20 (which constitutes a server) is operative to receive data from the cluster 18 and to perform at least part of the analysis according to the present invention. Communication of data between the external party computer 20 and the cluster 18 is by way of a network such as an Internet link.

Figure 2:
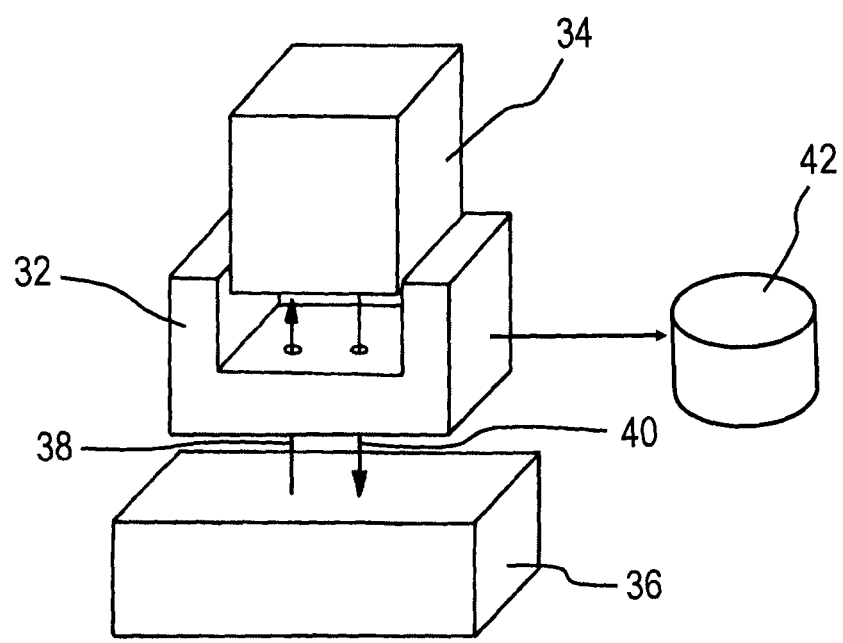
FIG. 2 represents the collection of system call data from the DCS of FIG. 1.

The collection of system call data from each client machine 14 of the DCS 10 of FIG. 1 is represented in FIG. 2. Collection of data from each client machine is by way of a collection tool 32. The collection tool 32 in effect sits between the user space 34 and the kernel space 36 of a client machine 14. All system calls 38, 40 (which each constitute a function call) between the user space 34 and the kernel space 36 are intercepted by the collection tool 32 and stored in data storage 42. Each intercepted system call constitutes a first data set. The data storage 42 is comprised in a hard disk of the DCS 10 or other suitable memory arrangement local to the client machine 14.

Forensic analysis according to the present invention will now be described further with reference to the flow chart 50 of FIGS. 3A and 3B. A first step 52 comprises filtering the intercepted and stored system call data to extract the file related system call data and thereby remove other system call data such as registry, process and memory related system call data. The filtering step 52 takes place in the client machine 14 and the extracted file related system call data is then stored in data storage local to the client machine. The filtering step 52 is accomplished by the collection tool. The collection tool is configured to filter function call data by subscribing during software development to the file related system call data. In one form, the collection tool is comprised in the minifilter described below. In another form, the collection tool is embodied as an algorithm apart from the minifilter. The filtering step 52 reduces the volume of system call data significantly although each extracted file related system call consists of 140 to 160 data elements and would therefore present a burden on resources of the DCS 10. Thereafter a data reduction model is applied to each first data set (i.e. each filtered system call) to form a second data set 54. The data reduction model is embodied in a minifilter developed to the Microsoft Filter Manager model. Application of the data reduction model involves reducing each extracted file related system call from 140 to 160 data elements to no more than 10 data elements. In some circumstances only two important data elements are required, such as a user account identifier and a process and object identifier. In other circumstances four important data elements are required. In further circumstances there are benefits to retaining more than four data elements. Irrespective of the number of data elements retained following application of the data reduction model, it can be appreciated that there is a considerable reduction in volume of data. Application of the data reduction model is described further below with reference to two examples illustrated in FIGS. 4A to 5C. Each second data set is then stored in data storage local to the client machine.

Figure 3A:
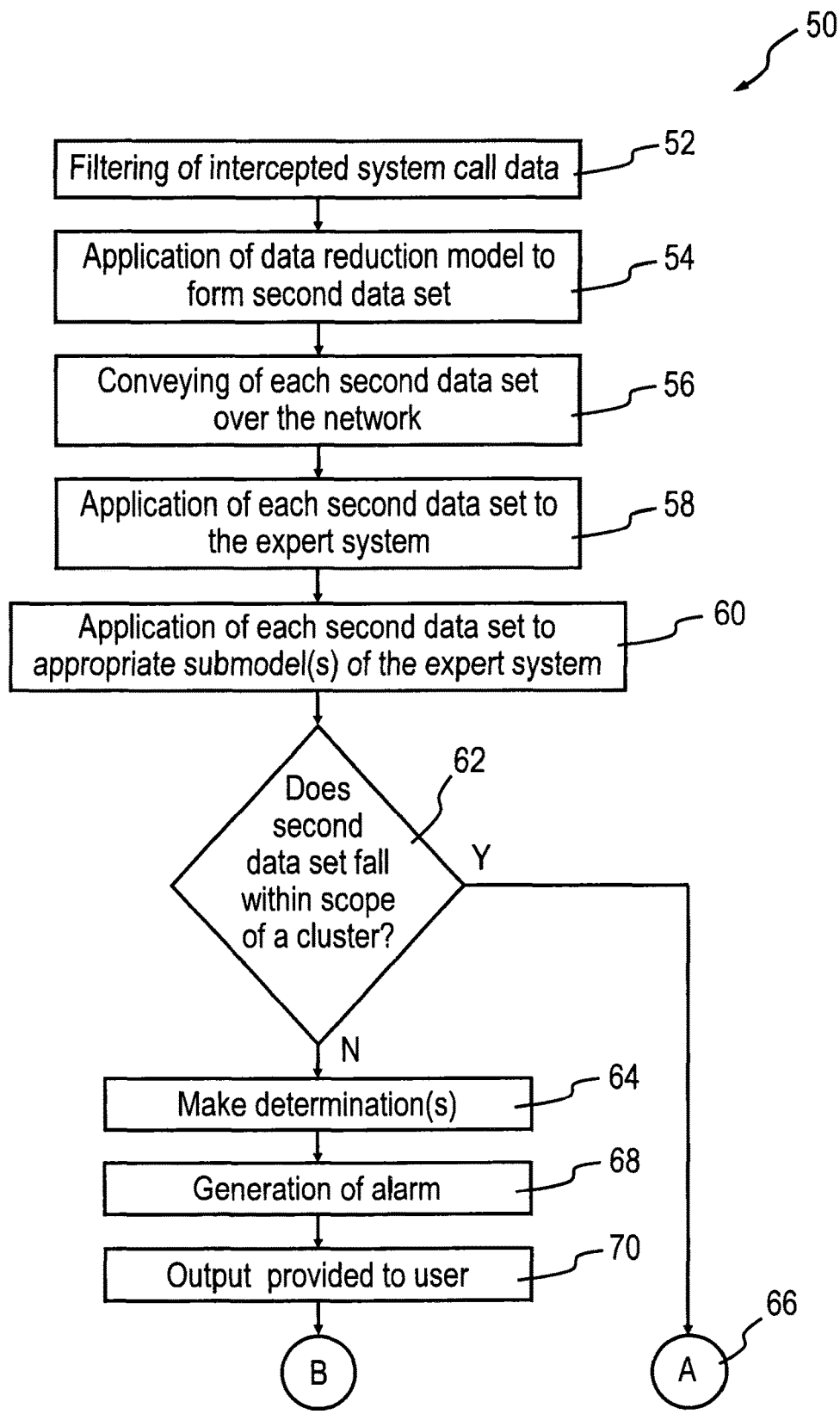
FIGS. 3A and 3B show a flow chart representing operation according to an embodiment of the present invention.
Figure 3B:
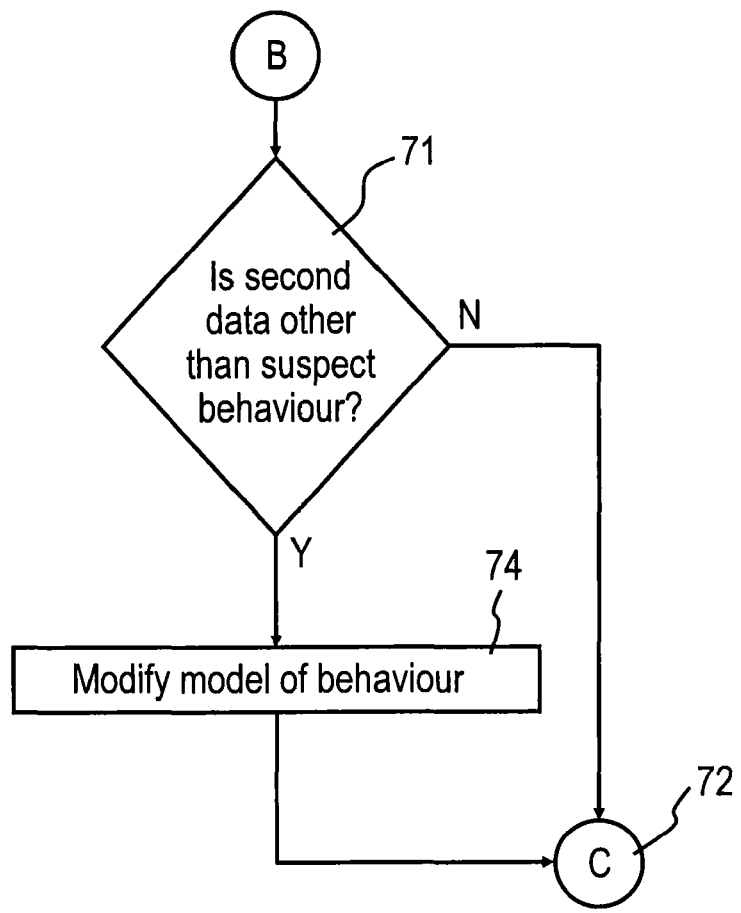

As shown in the flow chart of FIGS. 3A and 3B, each second data set is conveyed over the network 56 to the cluster 18 for analysis thereon. Alternatively and where analysis is to be performed at least in part on the external party computer 20 each second data set or data based on partial analysis of each second data set is conveyed over the network to the external party computer 20. The reduction in data volume achieved by way of application of the data reduction model reduces demands on the bandwidth of the network which may otherwise compromise operation by either making for slow transmission of data for forensic analysis to thereby militate against real time or near real time forensic analysis or slowing transmission of other network data. According to an alternative, un-illustrated embodiment the filtered first data sets are conveyed over the network to the cluster 18 or the external party computer 20 and application of the data reduction model takes place in the cluster 18 or the external party computer 20. The alternative embodiment is appropriate where the network is of sufficient bandwidth but the server (i.e. the cluster 18 or the external party computer 20) is of limited resource, such as where the external party computer 20 is a file server of modest processing power, and would militate against real time or near real time forensic analysis. Each second data set is converted to a data transfer object and stored in a ring buffer.

Irrespective of where the analysis is performed, analysis comprises reading each data transfer object from the ring buffer and applying each second set of data comprised therein to an expert system comprising a model of behaviour. As a preliminary process prior to application of the present invention as represented in the flow chart of FIGS. 3A and 3B, the expert system is operative to form a model of behaviour in dependence on normal behaviour of client machines 14 as reflected by system call data (which constitutes reference data) intercepted from the client machines during normal operation (i.e. when there is no suspect behaviour in the DCS) and which is subject to filtering and application of the data reduction model as described above. The thus processed system call data is subject to a clustering operation to form the model of behaviour. The model of behaviour is thus formed in an unsupervised manner. The formation and application of a clustering algorithm operative to perform clustering of the system call data is within the ordinary design capabilities of the person skilled in the art. Considering the formation of the model of behaviour further, the clustering algorithm is operative on different forms of system call data to form a different submodel for each different form of system call data whereby the model of behaviour comprises plural submodels. According to a first example, first to fiftieth submodels are formed from system call data for respective different function calls as identified by the process of the process and object identifier comprised in each function call. According to a second example, first to thirtieth submodels are formed from system call data for respective different users as identified by the user account identifier comprised in each function call. The model of behaviour comprises one, other or both of the submodels according to these first and second examples or indeed submodels based on a different form of system call data such as data for different locations as identified by the location identifier comprised in each function call.

Returning now to the flow chart of FIGS. 3A and 3B, each second data set is received in the cluster 18 or the external party computer 20 and is applied to the expert system 58 with an outlier detection algorithm being operative to apply the second data set to at least one appropriate submodel in dependence on the form of the second data set such as in respect of the process of the process and object identifier or the user account identifier comprised in the second data set 60. The formation and application of an outlier detection algorithm is within the ordinary design capabilities of the person skilled in the art. The outlier detection algorithm is operative to apply the second data set in accordance one or more different approaches depending on the nature of suspect behaviour that is to be detected. According to a first approach, which is shown in FIG. 3A, the outlier detection algorithm is operative to determine whether or not the applied second data set falls within the scope of a cluster of a submodel for the same process or same user identifier as the second data set 62. A determination is then made 64 if the second data set falls outside the scope of a cluster. More specifically if the second data set falls within the cluster, the second data set relates to normal behaviour and no action in respect of suspect behaviour takes place 66. If the second data set falls outside the cluster, the outlier detection algorithm is operative to determine that there is suspect behaviour 64 and to generate an alarm 68. According to a second approach, which is not shown in FIG. 3A, the outlier detection algorithm is operative to determine whether or not the second data set which is of different form to the submodel, for example in respect of different processes or different user identifiers, falls within the scope of a cluster of the submodel so as to exhibit the same or similar behaviour. If so, a determination is made that a process masquerading is as another process or a user is masquerading as another user and an alarm is generated. If not, the second data set relates to normal behaviour and no action in respect of suspect behaviour takes place. According to a third approach, which is not shown in FIG. 3A, the outlier detection algorithm is operative to determine whether or not the second data set falls within the scope of any cluster and thus fails to match or is insufficiently close to a submodel of any form in the model. If so, a determination is made that malware is present where the second data set relates to a function call or to an unauthorised user or an authorised user behaving in an inappropriate fashion is present where the second data set relates to a user. An alarm is then generated. If not, the second data set relates to normal behaviour and no action in respect of suspect behaviour takes place.

Thereafter the DCS is operative to provide an output on a video display unit to a user 70 in dependence on generation of an alarm to afford an opportunity for the user to assess the validity of the alarm. The output specifies that suspect behaviour has been detected and provides details of the nature of the suspect behaviour in accordance with the three example determinations described above. The output is provided on the video display unit in the form of a clickable area which the user clicks if he or she wishes to re-classify the second data set that provided the alarm as reflecting other than suspect behaviour 71. If the user does not click the clickable area the method continues with processing of second data sets 72. If the user clicks the clickable area the model of behaviour is modified such that the second data set in question is classified as normal behaviour 74. The expert system is thus operative at this stage in a supervised manner. Thereafter the method continues with processing of second data sets 72.

According to un-illustrated approach which is an alternative to the above described expert system approach, analysis involves forming a library of reference data sets which reflect normal behaviour. Then after filtering and application of the data reduction model to collected system call data each second data set is compared with each of plural reference data sets. Failure to match the second data set with any one of the reference data sets indicates suspect behaviour having been performed on a client machine.

Application of the data reduction model will now be described with reference to a first example illustrated in FIGS. 4A to 4C and a second example illustrated in FIGS. 5A to 5C.

Figures 4A, 4B:
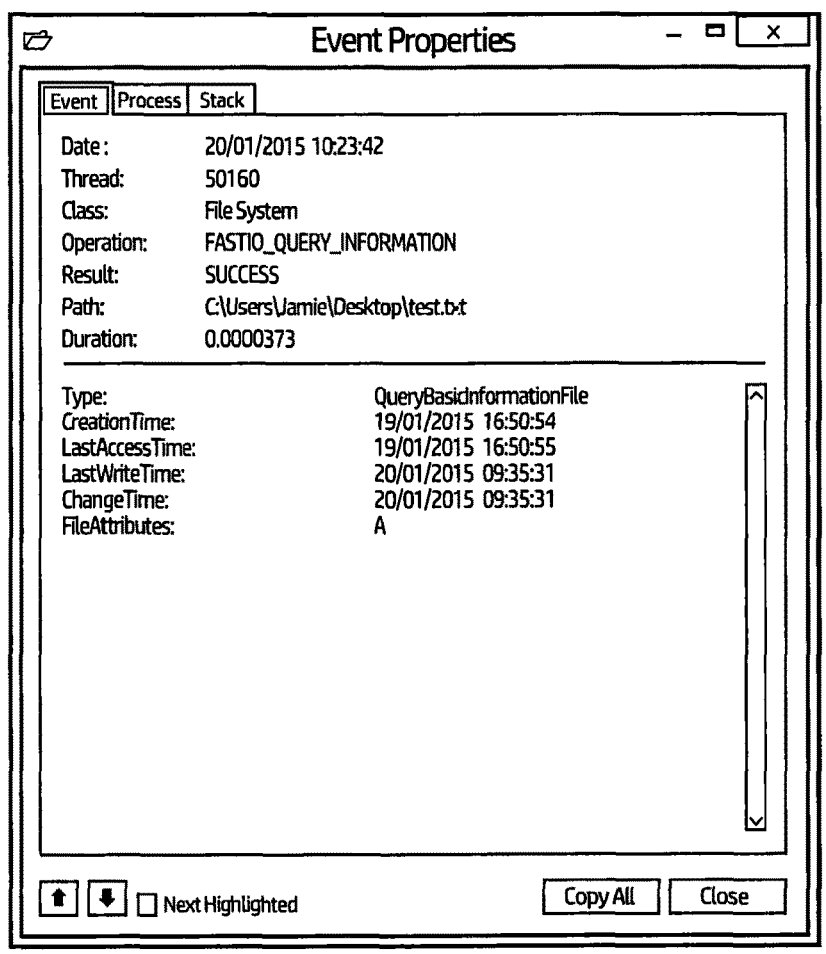
FIGS. 4A to 4C illustrate application of the data reduction model according to a first example.
Figures 4C, 5A:
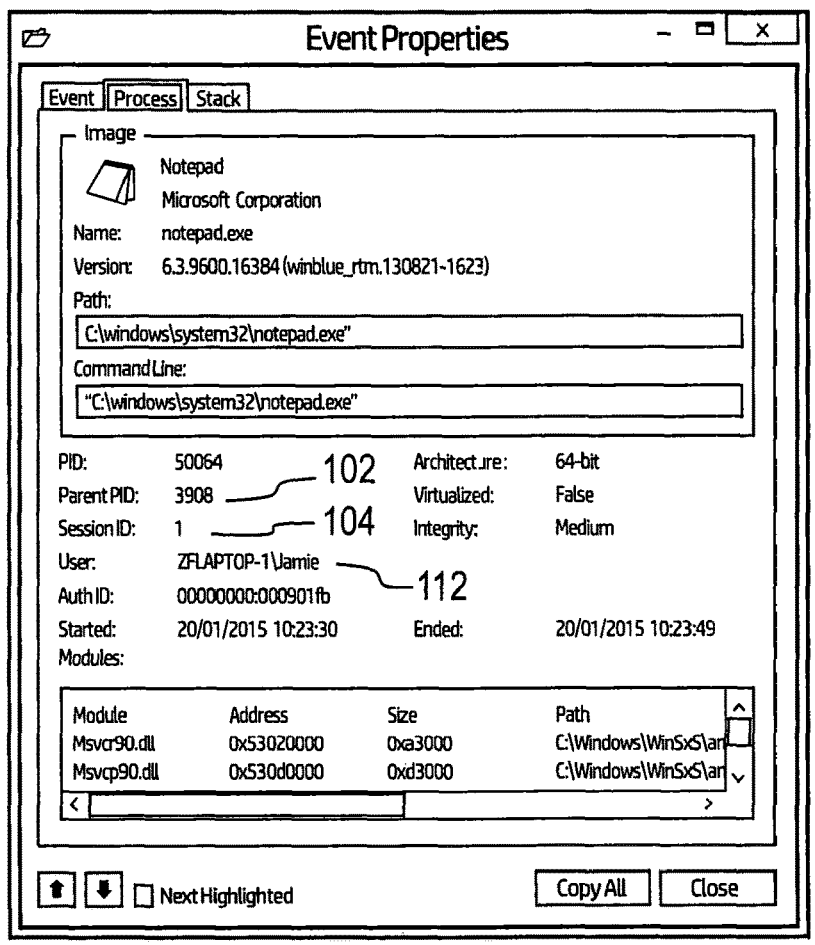
FIGS. 5A to 5C illustrate application of the data reduction model according to a second example.

The first example illustrated in FIGS. 4A to 4C relates to a read operation performed on a client machine 14 of the DCS 10 of FIG. 1 in which a user is reading a file comprised in the DCS which the user is not authorised to read such as confidential personnel records and such that the user's action is in contravention of an organisation's IT policy. FIG. 4A shows some attributes of a system call collected from one client machine 14 from various sources between the user space 34 and the kernel space 36 by the Process Monitor tool which is part of the systinternals toolkit from Microsoft. System call attributes collected by the Process Monitor tool are shown in FIG. 4A in preference to system call attributes collected as described above in accordance with the invention to provide for human readability so as to provide for clarity of explanation and do not reflect the form of the system call attributes as present and operated upon within the DCS in accordance with the invention. FIG. 4B is a screenshot of the 'event' tab of the event properties relating to the system call in question. FIG. 4C is a screenshot of the 'process' tab of the event properties relating to the system call in question. The screenshots of FIGS. 4B and 4C show the data that is collected to form the second data set of system call attributes which are shown in FIG. 4A. FIGS. 4B and 4C provide for human readability and explanation and do not reflect the form of the sources of system call data relied on for collection of system call attributes as present and operated upon within the DCS in accordance with the invention as described above.

Considering FIGS. 4A to 4C further, the user account identifier, which constitutes the 'who' element of a second data set, is based on the 'Parent PID' property of "3908" 102 and the 'Session ID' property of "1" 104 specified in the 'process' tab of the event properties shown in FIG. 4C. The 'User' and 'Parent PID' properties are linked back to determine the identity of the user, be it a human or machine user. The process and object identifier, which constitutes the 'what' element of a second data set, is based on the 'Operation' property of "FASTIO_QUERY_INFORMATION" 106 and the 'Path' property of "C:\Users\Jamie\Desktop/test.txt" 108 shown in FIG. 4A. The time attribute, which constitutes the 'when' element of a second data set, is based on the 'Date & Time' property of "20/01/2015 10:23:42" 110 shown in FIG. 4A. The location attribute, which constitutes the 'where' element of a second data set, is based on the 'User' property of "ZFLAPTOP-1\Jamie" 112 specified in the 'process' tab of the event properties shown in FIG. 4C. The described attributes are extracted from the larger volume of system call data to form a second data set by application of the data reduction model. Coding to provide for extraction of the described attributes in accordance with the invention and as described above will be within the ordinary capabilities of the person skilled in the art.

Figure 5B:
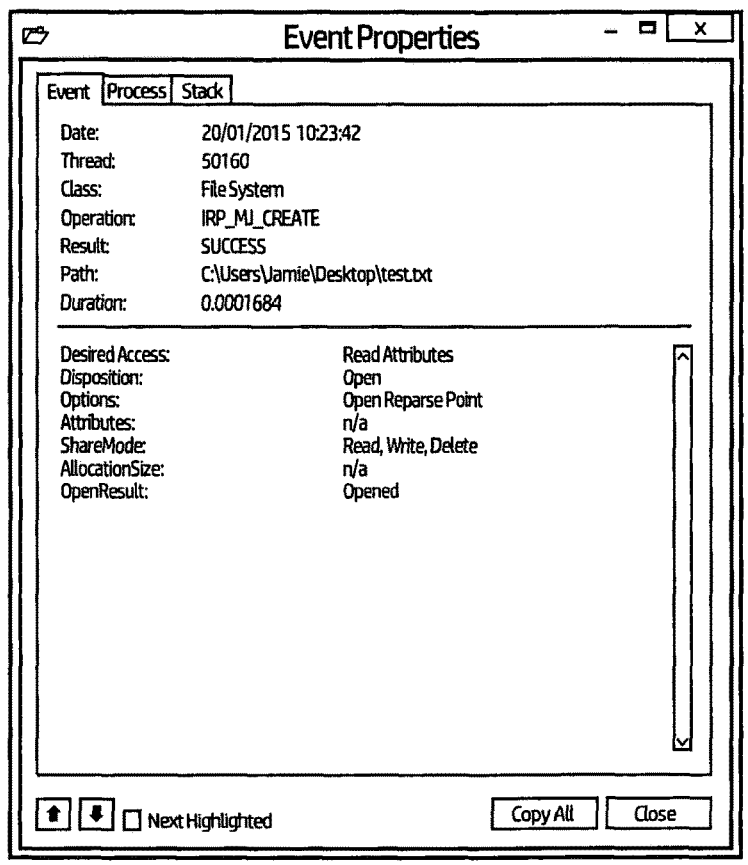
Figure 5C:
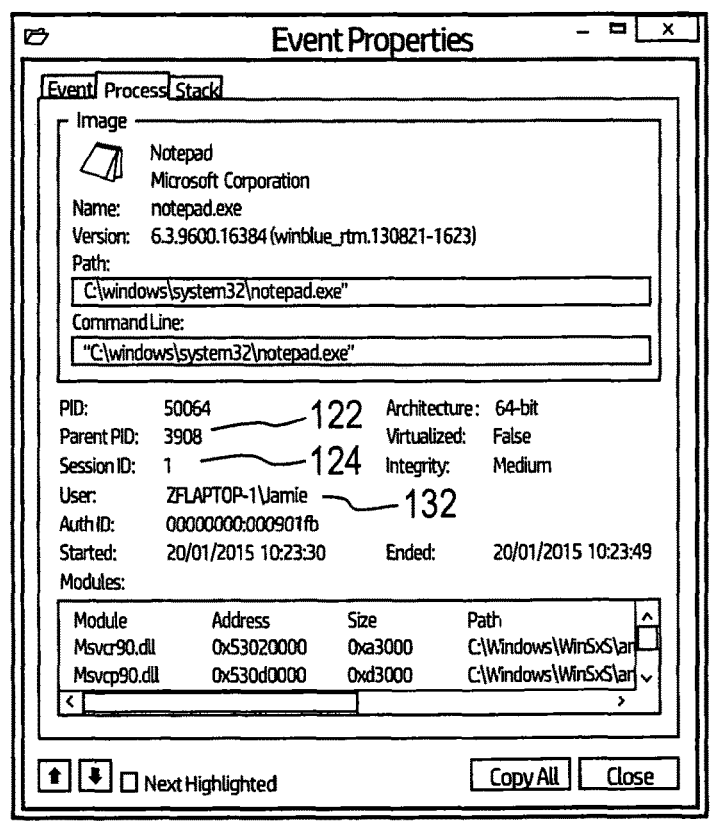

The second example illustrated in FIGS. 5A to 5C relates to a file open operation performed on a client machine 14 of the DCS 10 of FIG. 1 in which an authorised user opens a file comprised in the DCS with the capability to copy, write to and delete the file. As per FIG. 4A, FIG. 5A shows some attributes of a system call collected from the client machine 14 by the Process Monitor tool. The attributes shown in FIG. 5A are collected from various sources between the user space 34 and the kernel space 36. FIG. 5B is a screenshot of the 'event' tab of the event properties relating to the system call in question. FIG. 5C is a screenshot of the 'process' tab of the event properties relating to the system call in question. As per FIGS. 4A to 4C above, FIGS. 5A to 5C do not reflect the form of system call data as operated upon within the DCS in accordance with the invention and are presented to provide for clarity of explanation.

Considering FIGS. 5A to 5C further, the user account identifier, which constitutes the 'who' element of a second data set, is based on the 'Parent PID' property of "3908" 122 and the 'Session ID' property of "1" 124 specified in the 'process' tab of the event properties shown in FIG. 5C. The 'User' and 'Parent PID' properties are linked back to determine the identity of the user, be it a human or machine user. The process and object identifier, which constitutes the 'what' element of a second data set, is based on the 'Operation' property of "IRP_MJ_CREATE" 126 and the 'Path' property of "C:\Users\Jamie\Desktop\test.txt" 128 shown in FIG. 5A. The time attribute, which constitutes the 'when' element of a second data set, is based on the 'Date & Time' property of "20/01/2015 10:23:42" 130 shown in FIG. 5A. The location attribute, which constitutes the 'where' element of a second data set, is based on the 'User' property of "ZFLAPTOP-1\Jamie" 132 specified in the 'process' tab of the event properties shown in FIG. 5C. The described attributes are extracted from the larger volume of system call data to form a second data set by application of the data reduction model. Coding to provide for extraction of the described attributes in accordance with the invention and as described above will be within the ordinary capabilities of the person skilled in the art.

The invention claimed is:

1. A forensic analysis method performed on a Distributed Computing System comprising a server and at least one client machine, the method comprising:
    collecting data in a client machine of the Distributed Computing System, the collected data being a system call to a resource comprised in the Distributed Computing System, the system call being collected by a collection tool from between a user space and a kernel space of the client machine;
    filtering the collected data to form a first data set, filtering comprising extracting file related system call data but not registry, process and memory related system call data;
    applying a data reduction model to the first data set to form a second data set; and
    processing the second data set in the server of the Distributed Computing System to provide for detection of suspect behaviour at the client machine, in which
    the data reduction model is configured to extract a subset of data from the first data set to form the second data set, the subset of data comprising: a user account identifier; and a process and object identifier, the process and object identifier being one of: a process and physical resource identifier; and a process and logical object identifier.

2. The forensic analysis method according to claim 1 in which the data reduction model is embodied in a data reduction algorithm, the data reduction algorithm comprising a minifilter.

3. The forensic analysis method according to claim 1 further comprising forming a data transfer object in dependence on the second data set and storing the data transfer object in data storage comprised in the server.

4. The forensic analysis method according to claim 1 in which a number of data elements of the second data set is no more than half a number of data elements of the first data set.

5. The forensic analysis method according to claim 4 in which the number of data elements of the second data set is no more than 10% of the number of data elements of the first data set.

6. The forensic analysis method according to claim 1 in which the second data set consists of no more than ten data elements.

7. The forensic analysis method according to claim 1 in which the data reduction model is applied to the first data set in the client machine to form the second data set and the second data set is conveyed from the client machine to the server by way of a communication channel.

8. The forensic analysis method according to claim 1 in which the first data set is conveyed from the client machine to the server by way of a communication channel and the reduction model is applied to the first data set in the server to form the second data set.

9. The forensic analysis method according to claim 1 in which the subset of data extracted by the data reduction model further comprises a time element reflecting when a process associated with the process and object identifier was invoked.

10. The forensic analysis method according to claim 1 in which the subset of data extracted by the data reduction model further comprises a location identifier which reflects a location of one of: a software agent acting for a user account that initiates the system call; and an object operated on by a process of the process and object identifier.

11. The forensic analysis method according to claim 10 in which the location identifier is in respect of one of a physical location in the Distributed Computing System and a logical location in the Distributed Computing System.

12. The forensic analysis method according to claim 1 in which the step of processing the second data set in the server comprises analysing the second data set to detect suspect behaviour, the step of analysing the second data set to detect suspect behaviour comprising comparing the second data set with plural reference data sets and detecting suspect behaviour in dependence on the comparison, the plural reference data sets representing at least one of normal behaviour and suspect behaviour.

13. The forensic analysis method according to claim 1 in which the step of processing the second data set in the server comprises applying the second data set to an expert system comprising a model of normal behaviour, the model of normal behaviour being formed in dependence on normal reference data which reflects normal behaviour of the Distributed Computing System.

14. The forensic analysis method according to claim 13 in which an outlier detection algorithm is configured to apply the second data set to the model of normal behavior and to determine whether or not the second data set is in accordance with the model.

15. The forensic analysis method according to claim 13 further comprising modifying the model of normal behaviour in a supervised manner in dependence on user interaction with the Distributed Computing System.

16. The forensic analysis method according to any one of claims claim 13 in which the model of normal behaviour comprises plural submodels, each submodel being separately formed from a different form of reference data, and from reference data relating to one of: a different system call; and a different user.

17. A Distributed Computing System comprising:
a server computer system; and
at least one client computer system;
wherein the Distributed Computing System is configured to perform forensic analysis by collecting data in the at least one client computer system, the collected data being a system call to a resource comprised in the Distributed Computing System, the system call being collected by a collection tool, running on the at least one client computer system, from between a user space and a kernel space of the at least one client computer system; to filter the collected data to form a first data set, filtering comprising extracting file related system call data but not registry, process and memory related system call data; to apply a data reduction model to the first data set to form a second data set; and
wherein the second data set is processed in the server computer system of the Distributed Computing System to provide for detection of suspect behaviour at the client computer system, in which the data reduction model is configured to extract a subset of data from the first data set to form the second data set, the subset of data comprising: a user account identifier; and a process and object identifier, the process and object identifier being one of: a process and physical resource identifier, and a process and logical object identifier.

18. A non-transitory computer-readable storage medium embodying a set of instructions, which when executed by a Distributed Computer System including a client computer system and a server computer system, causes the Distributed Computer System to perform a method comprising:
collecting data in the client computer system of the Distributed Computing System, the collected data being a system call to a resource comprised in the Distributed Computing System, the system call being collected by a collection tool from between a user space and a kernel space of the client computer system;
filtering the collected data to form a first data set, filtering comprising extracting file related system call data but not registry, process and memory related system call data;
applying a data reduction model to the first data set to form a second data set; and
processing the second data set in the server computer system of the Distributed Computing System to provide for detection of suspect behaviour at the client computer system, in which
the data reduction model is configured to extract a subset of data from the first data set to form the second data set, the subset of data comprising: a user account identifier; and a process and object identifier, the process and object identifier being one of: a process and physical resource identifier; and a process and logical object identifier.

* * * * *